United States Patent Office 3,458,751
Patented July 29, 1969

3,458,751
CIRCUIT ARRANGEMENT FOR PRODUCING A SAWTOOTH CURRENT IN A DEFLECTION COIL FOR A CATHODE RAY TUBE AND A HIGH VOLTAGE
Antonius Boekhorst and Anthonie Jannis Moggre, Emmasingel, Eindhoven, Netherlands, assignors, by mesne assignments, to U.S. Philips Corporation, New York, N.Y., a corporation of Delaware
Filed May 7, 1965, Ser. No. 454,081
Claims priority, application Netherlands, May 12, 1964, 6405234
Int. Cl. H01j 29/70
U.S. Cl. 315—27  6 Claims

ABSTRACT OF THE DISCLOSURE

A combined flyback high voltage and horizontal scanning circuit for a cathode ray tube in which the transformer flux produced by the current to the horizontal output tube is supplemented by the flux produced by an auxiliary transformer winding which is energized by an auxiliary tube which is made periodically conductive at the scanning frequency. In the preferred arrangement the auxiliary tube is switched on by a rectangular wave at the horizontal frequency and by adjusting the bias of this tube by means of a voltage representative of the intensity of the flyback high voltage, this latter voltage is effectively regulated to a constant value.

---

Figure 1:
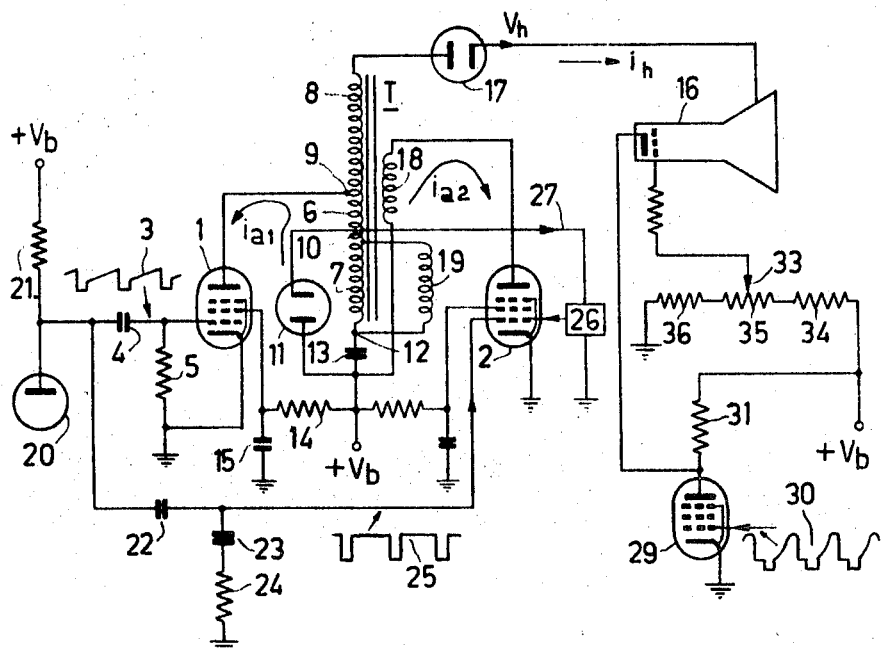

The invention relates to a circuit arrangement for producing a sawtooth current in a deflection coil for a cathode ray tube and a high voltage. The circuit arrangement comprises a supply voltage source, a first circuit element, to the control electrode of which a control signal is applied which periodically deenergizes the said circuit element, and a second circuit element. The circuit further comprises a transformer, on the core of which a first winding is wound to which the output electrode of the first circuit element is connected, and a second winding to which one electrode of a booster diode is connected, the other electrode of which diode is connected to the supply voltage source. The deflection coil to be energized is coupled magnetically to the first and the second winding. A third winding to which a rectifier is connected for producing the high voltage provided, for which purpose the pulses occurring during the fly-back of the sawtooth current are rectified.

Such an arrangement is known from U.S. patent specification 2,726,340. In this known circuit arrangement the second circuit element which ensures the stabilization of the produced high voltage is a ballast tube. However, the use of a ballast tube theoretically is wrong in fact. For, in case of small high voltage load, the first circuit element must still supply the maximum peak current. The excess of power supplied as a result at the output circuit or by this first circuit element must again be dissipated in the ballast tube. In case of small high voltage loads consequently power must be supplied first to the output circuit and then the greater part of this power must be dissipated in the second circuit element. This does not only mean that in case of small high voltage load the efficiency of the circuit is very poor but, in addition, the first circuit element must always operate at its maximum power which can considerably reduce the life of this first circuit element.

Only at great high voltage loads does the efficiency of the circuit arrangement become satisfactory because in that case only a small portion of the power supplied must be dissipated by the ballast tube.

It is the object of the invention to avoid this drawback and the circuit arrangement is consequently contsructed so that only that amount of power is supplied to the output circuit as is required at that instant.

In order to realize this, the circuit arrangement according to the invention is characterized in that an additional winding is wound on the transformer, one end of which is connected to the output electrode of the second circuit element and the other end of which is connected to a terminal of the supply voltage source and the winding sense of which is such as to produce magnetic flux through the core in the same direction as that of the first winding. The said additional winding is D.C. separated from the first and the second winding and a control signal which cuts off the said second element periodically and appears in synchronism with the first-mentioned control signal is also applied to the control electrode of the second circuit element.

It is noted that it is known per se from Dutch patent specification 106,698 to control the line output tube, which in this specification is termed the first circuit element, in a manner such that when the high voltage load increases, the average anode current increases. As a result of this it is also possible to supply only that power to the output circuit which is required at that instant.

However, difficulties present themselves in this method, in particular in case of very high loads, such as they occur, for example, in colour television receivers, in connection with the voltage drop across the booster diode. As a matter of fact, the direct current component of the anode current, which is more or less sawtooth-shaped through the line output tube, being the average anode current, must reach the said line output tube through the booster diode. As will be explained below this has for its result that, either at the end or at the beginning of the stroke period, such a voltage drop occurs across the booster diode that the anode voltage for the line output tube falls below the value required for taking the desired anode current. In other words, the grid bias voltage can be brought to the desired value but this does not guarantee the flow of the required anode peak current because the desired anode voltage cannot be reached. This plays a part in particular in so-called television receivers without supply transformers because in these receivers the mains voltage is not stepped up so that the voltage of the supply voltage supplied by the supply voltage apparatus of this receiver cannot be raised at will.

If the number of turns of the first winding of the output transformer were to be decreased so as to increase the voltage operative at the anode of the line output tube during a stroke period, the voltage drop across this first winding decreases, but the anode peak current at the end of the stroke must then be increased again so as to be able to go on supplying, during the stroke period, the power consumed during the fly-back period. An increased anode peak current again results in an increase of the voltage drop across the booster diode, so that the gain as a result of the decrease of the number of turns is lost again wholly or for the greater part.

According to the invention the above drawbacks are avoided not only by using a second circuit element for adding the power required at that instant when the high voltage load varies, but also by providing the said additional winding on the transformer core and connecting same between the second circuit element and the supply voltage in a manner such that the current for this second circuit element bypasses the booster diode.

According to a further recognition of the invention this is possible because we have to do with the compensation of losses during the fly-back period and not with the maintenance of circulating magnetic energy. The connection of the booster diode in this compensation circuit consequently serves no purpose but results, as explained above, again in additional dissipation losses in the booster diode.

Figure 2:
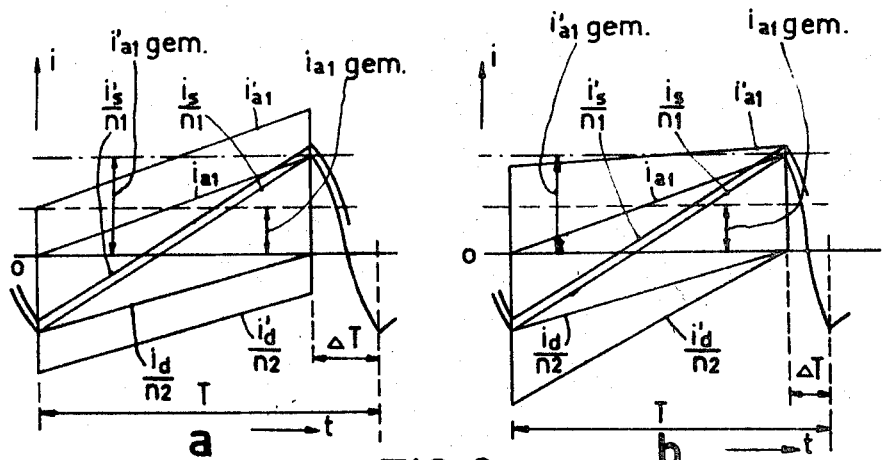
Figure 3:
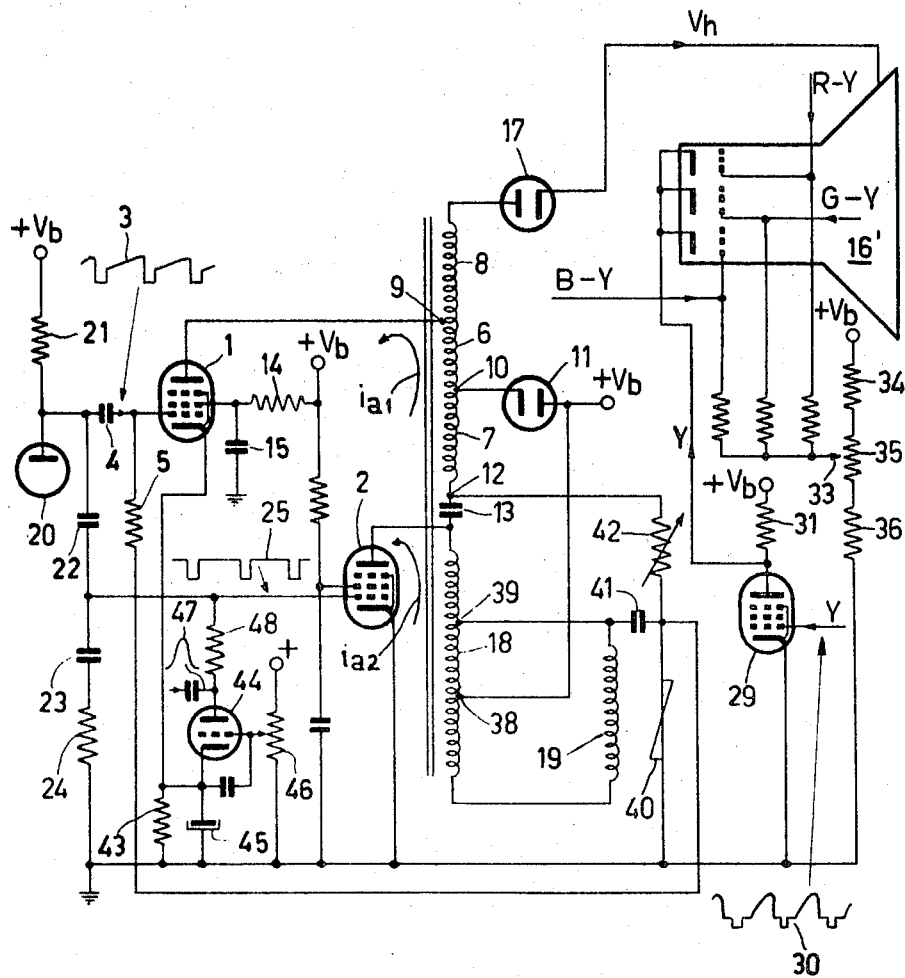

In order that the invention may readily be carried into effect, a few possible embodiments of circuit arrangements according to the invention will now be described in greater detail with reference to the accompanying figures in which:

FIG. 1 shows a first embodiment of a single-gun picture in which the two circuit elements are constructed as tubes, in particular as pentodes, and in which only the second circuit element is controlled, FIG. 2 shows transformed current diagrams to explain the drawbacks which are associated with bias voltage control of the first circuit element alone and FIG. 3 shows a second embodiment in which both the first and the second circuit element are controlled.

In the embodiment shown in FIG. 1 the two circuit elements 1 and 2 are constructed as pentodes. In this embodiment the first circuit element serves as a line output tube, to the control grid of which is applied a more or less sawtooth control signal 3, the said control signal produces cut-off in the tube 1 periodically. The said signal 3 is applied through a grid capacitor 4 and a grid resistor 5, which coupling network does not deform the signal 3.

In the anode circuit of the line output tube 1 is connected the line output transformer T. On the core of the said transformer are provided a number of winding portions 6, 7 and 8 which, in the embodiment shown in FIG. 1, constitute an autotransformer winding and the additional winding 18 according to the invention.

The tapping 6 is connected to the anode of the line output tube 1, the tapping 10 being connected to the cathode of the booster diode 11, the anode of which is connected to the positive terminal of the supply voltage source. This supply voltage source supplies a supply voltage $+V_b$.

The end 12 of the second winding 7 is connected to the positive terminal of the supply voltage source through the capacitor 13 associated with the booster diode circuit. The screen grid of the tube 1 obtains its supply voltage from the said positive terminal through a resistor 14 and is decoupled against earth by means of the capacitor 15.

As is known, the capacitor 13 stores the circulating magnetic energy and supplies it again as soon as necessary in the output circuit. The losses occurring in the circuit are equal to the voltage drop during the stroke period across the winding portion 6 multipled by the average anode current through the tube 1. In particular in colour television these losses are to a great extent determined by the beam current flowing through the cathode ray tube 16 which serves as the television picture tube.

As a matter of fact, the supply voltage $V_h$ of the final anode of the picture tube 16 is derived from the cathode of the rectifying diode 17 the anode of which is connected to the end of the third winding portion 8. This winding portion 8 steps up the fly-back pulses which are then rectified by means of the diode 17.

When the beam current through the picture tube varies, the load for the high voltage circuit varies. In other words, when the beam current through the tube 16 increases the losses in the output circuit of the line output tube 1 increase and consequently these losses have to be compensated.

In the circuit arrangement shown in FIG. 1 the tube 1 is not controlled at all and, in addition, its anode voltage is adjusted so that it always lies above the so-called knee voltage. This means that the anode current of the tube 1 is substantially independent of the load and there consequently is no reason for the anode current to vary when the high voltage load varies.

When the high voltage load increases, however, it is necessary that the additional power then required is supplied. This is effected according to the invention by the additional winding 18 and the second circuit element 2 which is also constructed as a tube. In the embodiment shown in FIG. 1 this additional winding 18 has the same winding sense as the winding portions 6 and 7. By connecting the additional winding 18 in the manner shown in FIG. 1, the anode currents $i_{a1}$ and $i_{a2}$ (the arrows, denoted $i_{a1}$ and $i_{a2}$, indicate the directions of current of the anode currents through the tubes 1 and 2) are rectified and, consequently, the winding sense of the winding 18 must be the same as that of the winding portions 6 and 7. The above connection and flow of current $i_{a2}$ through the winding 18 means that during the flow of current $i_{a2}$ electromagnetic energy is accumulated in the core of the transformer T and in the line deflection coil 19. This additionally applied electromagnetic energy may then be used as the supply energy for the picture tube 16.

In principle there are two periods in which this additional energy can be supplied. The first period is during the stroke period of the sawtooth current which will flow through the line deflection coil 19 which is connected across a portion of the second winding portion 7 and is consequently coupled also magnetically with the first winding portion 6. The second period is during the fly-back period.

When the tube 2 is made to convey current during the stroke period, electromagnetic energy will be accumulated during this stroke period in the core T and the deflection coil 19, which electromagnetic energy is converted during the fly-back period into high voltage pulses which supply the supply voltage $V_h$ after rectification. However, in this case it is necessary that a control signal is applied to the first control grid which signal opens the said tube during the stroke period. Consequently, a pulsatory signal 25 is derived from the same pulse generator 20—across the anode resistor 21 of which a more or less pulsatory signal is produced—as from which the more or less sawtooth signal 3 is derived by means of the integrating network 22, 23, 24 which signal has a substantially constant value both during the stroke period and during the fly-back period and which serves for controlling the tube 2. It is also necessary, however, that the value also of the anode current depends upon the high voltage load. For that purpose a known control circut 26 is included which, through the line 27, is connected to the tapping 10 and which produces a negative voltage which is applied as a bias voltage to the first control grid of the additional tube 2. When the beam current $i_h$ of the picture tube 16 increases, the negative voltage supplied by the control circuit 26 decreases and consequently the anode current $i_{a2}$ of the tube 2 increases. The cathode of the tube 2 is connected to earth. In the embodiment shown in FIG. 2 the cathode of the picture tube 16 is connected to the anode of the video output tube 29, to the control grid of which the video signal 30 is applied, which amplified video signal is produced across the anode resistor 31 and serves for controlling the cathode of the picture tube 16.

When the beam current $i_h$ of the tube 16 varies as a result of the video signal applied to it, the anode current $i_{a2}$ will vary accordingly so that always that quantity of additional power is applied to the output circuit of the tube 1 which is necessary to supply the required high voltage power.

Another reason why the beam current through the tube 16 can vary lies in the variable brightness adjustment which can be adjusted by means of the variable tapping 33 provided on the potentiometer which comprises the resistors 34, 35 and 36. In this case also the negative voltage at the control grid of the tube 2 will vary when the brightness adjustment varies and therewith the same control will be obtained as is described for the beam current variation as a result of the applied video signal.

Inorder to emphasize the advantage of the circuit arrangement according to the invention with respect to the known system, as is described in Dutch patent specification 106,698, FIG. 2a shows the case in which the tube 2 is not present and in which only the bias voltage of the tube 1 is varied as a function of the high voltage load. FIG. 2b shows the case in which in addition to the bias voltage of the tube 1 the slope also of the sawtooth control signal is varied, as is described, for example, in British patent specification 932,616.

In FIG. 2a the line indicated by $i_{a1}$ denotes the current through the line output tube during the stroke period $i_s/n_1$ is the current through the deflection coil 19, wherein $n_1$ is the turns ratio between the number of turns of the winding portions 6 and 7 and the number of turns of the part of the winding portion 7 to which the deflection coil 19 is connected, and $i_d/n_2$ is the current through the booster diode 11, $n_2$ being the turns ratio between the number of turns of the winding portions 6 and 7 with respect to the number of turns of the winding portion 7.

The same currents with an accent, so $i'_{a1}$, $i'_s/n_1$ and $i'_d/n_2$ are the corresponding currents which will occur at maximum beam current through the picture tube 16 when the bias voltage of the tube 1 is controlled to such a value that the anode current $i'_{a1}$ will flow. Moving the line $i_s/n_1$ to the line $i'_s/n_1$ is to indicate the apparent flux variation through the transformer core T or, in other words, the increase of the premagnetization of the said core as a result of the larger average current which flows through the winding portion 6. For the case of minimum beam current through the tube 1, the said average current is indicated by the broken line with a value $i_{a1\ gem}$, while for the maximum beam current the average anode current is indicated by the dot-and-dash line with the value $i'_{a1\ gem}$.

It may be seen from FIG. 2a that the anode peak current at the end of a stroke period at maximum beam current assumes a considerable value. For example, when such a control is used in a colour television receiver at a total beam current of 1.5 ma., the anode peak current at the end of the stroke will be approximately 750 ma. At a beam current of approximately 50 microamperes this beam current is approximately 500 ma. This means that the average anode current through the tube 1 at a beam current of approximately 50 ma. will be approximately 250 ma. and in case of a beam current of 1.5 ma. this will be approximately 500 ma. In other words $i_{a1\ gem}=250$ ma. and $i'_{a1\ gem}=500$ ma. From this it follows that at the end of the stroke period the maximum transformed diode current $i'_d/n_2$ must also be approximately 250 ma., and this is the transformed current, so that actually the current through the booster diode 11 at a beam current of 1.5 ma. still has a considerably greater value. At such a large current through the booster diode 11, the voltage drop across it will also be considerable so that the voltage available at the anode of the tube 1 will consequently be decreased. However, for a peak current of 750 ma. to flow, this active anode voltage must have a greater value so that the effect explained in the introduction occurs that at the end of the stroke it is not possible to adjust the tube 1 in a manner such that it atcually can supply the required peak current of 750 ma. In addition, the supply of the screen grid of the tube 1 is effected through the screen grid resistor 14. At a larger anode peak current the screen grid current also will increase and consequently the screen grid voltage $V_{g2}$ will decrease. At a reduced screen grid voltage a higher anode voltage would be necessary to draw sufficient electrons to the anode. The presence also of the screen grid resistor 14 consequently is the cause that the tube 1 is not capable of supplying the required anode peak current $i'_{a1}$ at a large beam current.

This is the case in particular when no power transformer is present in the supply part of the receiver because then supply voltages of maximally 220 v. are available. In addition to the advantage of lower cost, the omission of a transformer has the advantage that the vertical deflection is not adversely influenced by the leakage field of the transformer.

As already explained in the introduction, these drawbacks are avoided not only by using a separate circuit element, in this case the tube 2, but also by causing the supply for this additional tube to be effected not through the booster diode 11 but to bypass it. In that case one is not troubled by the voltage drop across this diode at a large beam current.

The solution as proposed in the British patent specification 932,616 also is not satisfactory at large beam currents. This will be clear after a consideration of FIG. 2b. In this figure also start is made from an initial condition in which substantially no high voltage load is operative. For this condition again the lines hold indicated by $i_{a1}$, $i_s/n_1$ and $i_d/n_2$. As described in the said British patent specification, not only the bias voltage of the tube 1 but also, for example, the slope of the sawtooth control signal 3 is varied when the high voltage load increases. This means that the anode current $i_{a1}$ would change into an anode current $i'_{a1}$ and, as clearly appears from FIG. 2b the anode current, to fulfill the condition that the diode current at the end of the stroke is zero, will have only a somewhat smaller value at the beginning of the stroke than at the end of the stroke. This implies, however, that in that case the diode current $i_d$ at the beginning of the stroke must have a vary large value since at the beginning of the stroke not only current required for maintaining the circulating magnetic energy but also the additional current must flow through the booster diode 11 which also flows through the pentode tube 1. This is indicated in FIG. 2b by the line $i'_d/n_2$ and, assuming the anode current $i'_{a1}$ at the beginning of the stroke to be approximately 480 ma., the transformed diode peak current will have to be even 800 to 900 ma. Consequently, the current actually flowing through the booster diode 11 will have to be considerably larger. Not counting the fact that the diode 11 is not suitable for conveying such exorbitantly high currents, it will be clear that in that case the voltage drop across the diode 11 will assume an even far greater value so that as a result the anode voltage of the tube 1 decreases and this tube can consequently not supply the required 480 ma. at the beginning of the stroke. For all these reasons the solution according to British patent specification 932,616 is not suitable for the very large beam currents of, for example 1.5 ma. such as they can flow in the case of colour television receivers.

In the embodiment of FIG. 1 the cathode ray tube 16 is shown as a single-gun picture tube. The tube 16 may serve for reproducing a black-and-white television image but also for reproducing a colour television image. In this latter case the tube 16 must be of the indexing type, the so-called apple tube, or of the chromation type, the so-called Lawrence tube. In all these cases it will be clear that at very large beam currents the additional tube 2 ensures the supply of the additionally required power. Of course, a wide range of choice of the adjustment of the tube 1 is available so that the instant of supply of power by the tube 2 can be chosen arbitrarily. For example, the assembly may be adjusted so that the tube 2 becomes operative as soon as the beam current through the tube 16 exceeds 50 ma. but it may alternatively be constructed so that the tube 2 starts only at beam currents exceeding 50 ma., for example, the value of 200 to 300 ma. It is only a matter of which quantity of high voltage power is to be supplied by the tube 1 and which quantity by the tube 2.

FIG. 3 shows a second embodiment in which not only the single-gun picture tube 16 is replaced by a three-gun picture tube 16' but in which also the means for producing the bias voltage dependent upon the load current for the second circuit element are constructed differently. Otherwise, the same components in the embodiment of FIG. 3 have been given the same reference numerals as those of FIG. 1 as much as possible.

From FIG. 3 it appears that the additional winding 18 according to the invention, connected as shown in this figure, must have the same winding sense as the first winding 6 because the direction of the currents $i_{a1}$ and $i_{a2}$ are the same. When on the contrary the positive terminal of the supply voltage source would be connected to the junction of the capacitor 13 and the winding 18 and the anode of the tube 2 to the tapping 38 to which now the positive terminal of the supply voltage source is connected, the direction of the current through the winding 18 would be reversed and in this case also its winding sense would have to be opposite to that of the winding 6.

In principle the capacitor 13 could also be connected between the winding portions 6 and 7. For, the winding portion 7 and the capacitor 13 are connected in series and (not counting any voltages to be derived from the tapping 12) the changing of two series-connected elements does not vary the circuit arrangement as such. Naturally, this must be effected so that a D.C. connection remains between the diode 11 and the anode of the tube 1 because the direct current supply of the tube 1 must take place through the diode 11.

A further difference from the embodiment shown in FIG. 1 is that the horizontal deflection coil 19 is connected to the winding 18, namely between the tapping 39 and the end of this winding remote from the anode of the tube 2. It naturally holds that the horizontal deflection coil is coupled magnetically to the first and the second winding because the additional winding 18 also is coupled magnetically to the first winding portion 6 and the second winding portion 7 through the core of the transformer T.

The most important difference with respect to the embodiment shown in FIG. 1, however, is that the bias voltage for the second circuit element 2 is derived indirectly from the beam current. As a matter of fact, in the circuit arrangement shown in FIG. 3 a control circuit is provided which comprises a voltage-dependent resistor 40 to which are applied fly-back pulses derived from the tapping 39 through a capacitor 41 and to which a bias current is applied which can be adjusted by means of the variable resistor 42, the end of which remote from the voltage-dependent resistor 40 is connected to the junction 12 at which an increased direct voltage is set up which is produced by means of the booster diode circuit. A negative direct voltage which is applied, through the leakage resistor 5, to the control grid of the tube 1 is set up at the junction of the voltage-dependent resistor 40 and the capacitor 41. Since the pulses at the tapping 39 experience a small variation when the high voltage load varies, the negative voltage also at the control grid of the tube 1 will vary and thereby the average anode current of the tube 1. This variation of average anode current, however, is kept very small and exclusively serves to obtain a variable voltage at the cathode resistor 43 which is included in the cathode line of the tube 1. In this manner it is reached that a direct voltage which is dependent upon the beam current is produced across the resistor 43, which direct voltage is used for varying the bias voltage of the tube 2 as a function of the high voltage load. In this case the direct current amplifying properties of the tube 1 are used, as it were, so that a very effective control is possible. In addition, to vary the anode current of the tube 1 as little as possible, an additional amplifier tube 44 is provided which further amplifies the direct voltage which is produced across the resistor 43 and converts it into a negative voltage which ultimately controls the tube 2.

For that purpose the direct voltage across the resistor 43 which is shunted by means of a smoothing capacitor 45 is applied to the cathode of the amplifier tube 44. By means of a tapping at the potentiometer 46 the tube 44 is adjusted at the desired bias voltage which can be chosen to be so that the anode current $i_{a2}$ of the tube 2 is zero when the beam current of the tube 16 lies below 50 ma. However, the adjustment may also be such that even at a beam current zero the tube 2 still takes a certain anode current. In that case the losses which still occur in the output circuit of the tube 1 at a beam current zero will already partly be compensated by the additional power which is applied from the tube 2 to the circuit. In addition, fly-back pulses 47 are applied to the anode of the tube 44 which fly-back pulses can be derived from the transformer T. By a rectifying action of the tube 44 a negative voltage is set up at its anode which is applied through resistor 48 to the control grid of the tube 2. Consequently the negative voltage at the control grid of the tube 2 will vary as a function of the beam current load and therewith the average anode current of the tube 2. The alternating current signal 25 is also applied to the control grid of the tube 2 in FIG. 3 which ensures the periodic conduction in the tube 2. As explained above, a very efficient control has become possible by the amplifying action of the tubes 1 and 44. As a result of this the variation of the anode current of the tube 1 can be kept very small and this tube can be adjusted in the most favourable manner, that is to say at an adjustment such that the required peak current can easily be supplied by the tube and the voltage drop across the booster diode 11 assumes no undesired proportions. The increasing anode current in the tube 2 supplies the additionally required power, with the high voltage load increasing, but since the supply voltage for the tube 2 by-passes the booster diode 11, the large peak currents which flow through the tube 2 present no difficulties in connection with the voltage drop across the booster diode 11. To explain this, reference is made to the table below.

TABLE

| | | | | |
|---|---|---|---|---|
| $i_{KSB}$, ma | 0 | 0.5 | 1.0 | 1.5 |
| $i_{a1}$ gem ma | 186 | 198 | 207 | 215 |
| $i_{a2}$ gem ma | 30 | 102 | 176 | 256 |
| $V_{a1}$ end volt | 80 | 79 | 77 | 70 |
| $V_{a2}$ end volt | 73 | 72 | 71 | 70 |
| $P_{a1}$ watt | 13 | 12.5 | 12.3 | 10 |
| $P_{a2}$ watt | 2.4 | 7.5 | 11.3 | 14.4 |

This table may be explained as follows. On the top line $i_{KSB}$ denotes the beam current through the tube 16'. It is seen that this beam current varies from 0 to 1.5 ma.

On the second line the average anode current $i_{a1\,gem}$ of the tube 1 is indicated and it is seen that the variation of the average anode current through this tube experiences only a small variation namely from 186 ma. at a beam current 0 to 215 ma. at a beam current of 1.5 ma.

On the third line is indicated the associated average anode current $i_{a2\,gem}$ through the tube 2. It is seen that this average anode current experiences a very strong variation, namely from 30 ma. at a beam current 0 to 256 ma. at a beam current 1.5 ma. On the fourth line is indicated the voltage $V_{a1\,end}$ namely the anode voltage of the tube 1 at the end of the stroke period. On the fifth line is indicated the voltage $V_{a2\,end}$ namely the anode voltage of the tube 2 at the end of the stroke. In particular from this voltage it is seen that the anode voltage of the tube 2 always remains low so that the dissipation of the tube 2 itself also remains low. The last two lines of the table refer to the dissipation losses; on the penultimate line is stated $P_{a1}$, being the power dissipated in the tube 1, which reduces from maximally 13 watts at beam current 0 to 10 watts at a beam current 1.5 ma. The power $P_{a2}$ dissipated in the tube 2, however, increases, naturally, from 2.4 watts at a beam current 0 to a power of 14.4 watts at a beam current 1.5 ma. A dissipated power of 14.4 watts is reasonable and considerably lower than a power of 37.5 watts maximally to be dissipated in a ballast tube at a beam current 0 when this ballast tube is connected between the output anode of the picture tube 16' and earth, in which the high voltage for the output anode $V_h = 25$ kv. and the maximally occurring beam current is 1.5 ma. Not only must it be possible for such a ballast tube to take a power of 37.5 watts but in addition it must be capable of bearing the high voltage of 25 kv. namely at the very high increasing temperatures.

All these problems are avoided when, according to the invention, the tube 2 is used since both its dissipation and its maximum anode voltage assume much smaller values than when a ballast tube is used. This mainly results from the fact that the tube 2 must supply power and only the fact that supply goes hand in hand with natural losses causes the tube 2 to have to be suitable for dissipating a certain power. On the contrary, when a ballast tube is used all the additionally supplied power must be dissipated in the ballast tube. Not only is the efficiency of the circuit arrangement considerably reduced thereby, but also the requirements which are imposed upon the ballast tube are considerably greater.

When the requirement is omitted that the average anode current of the tube 1 may not vary strongly, the control of the tube 2 may alternatively be omitted and only the tube 1 be controlled, as a result of which the parts 43 to 46 are omitted. In that case the tube 2 obtains a constant bias voltage through the resistor 48 namely such that a considerable part of the losses is already received by the tube 2. Only at the very large beam currents through the tube 16' must the average anode current through the tube 1 increase, which is controlled by means of the control circuit comprising the elements 40, 41 and 42. Of course this does not result in the most favorable way of driving for the tube 1, so that the method in which the average anode current through the tube 1 is kept substantially constant and the anode current through the tube 2 is controlled when the beam current increases, is to be preferred.

In principle, however, it is possible to control the one or the other tube because always the advantage is maintained that the greater part of the additionally required power bypasses the booster diode 11 and consequently the voltage drop across the said diode does not play a part so that low supply voltages $V_b$ can be used and thus no power transformer is necessary for the supply part.

Although above the control signal 25 has always obtained a polarity such that the tube 2 is made conductive during the stroke period (first possible period of conduction) and cut off during the fly-back period, it will be clear that the way of controlling the tube may alternatively be reversed so that then the tube 2 is cut off during the stroke period and conductive during the fly-back period (second possible period of conduction). In that case the winding sense of the additional winding 18 will have to be reversed with respect to the case that the tube 2 is made conductive during the stroke period so that during the fly-back period power is supplied. This involves that the winding 18 can then have only a few turns because always a voltage will be induced in the additional winding 18 from the winding portions 6 and 7 during the fly-back period. This induced voltage, however, must be smaller in absolute sense than the supply voltage because otherwise the anode voltage of the tube 2 would fall below a value at which the tube 2 could still supply the required anode current. A small number of turns of the additional winding 18, however, involves that great peak currents will have to flow through the tube 2 during the release of the said tube since the number of ampere turns AW is decisive of the flux in the core material. The current requirements for the tube 2 are consequently considerably greater than in case the tube 2 is made conductive during the stroke period which is understandable since when the tube 2 conducts during the stroke period the time for supplying the additional power is much greater than when the tube 2 is made conductive during the fly-back period. For all these reasons it is to be preferred to effect the deattenuation of the output circuit of the tube 1 by means of the tube 2 during the stroke period and not during the fly-back period.

However, in principle the method in which the release is effected during the fly-back period has still many advantages with respect to the case that energy is dissipated in a ballast tube, for the mere reason already that the efficiency of the circuit arrangement in case of supplying power is much more favourable than when dissipating excessively supplied power.

It will also be clear that, although above the amplitude of the signal 25 has always been kept constant and the control of the tube 2 has been effected by means of the bias voltage variation dependent upon the high voltage load, it is alternatively possible to keep the bias voltage for the tube 2 constant and to vary the A.C. signal 25 as a function of the high voltage load. This is possible, for example, by varying the amplitude of the signal 25 as a function of the high voltage load. It will be clear that, since this signal has a substantially constant value both during the fly-back period and during the stroke period a variation of the amplitude of this signal at a constant bias voltage of the tube 2 also results in a variation of the average anode current of the tube 2. Since, however, it is possible in a simple manner to derive a bias voltage variation for the tube 2 from the beam current variation of the tubes 16 and 16' respectively, since we have to do with direct voltage and direct current variations, the way of bias voltage variation as indicated in the circuit arrangements shown in FIGS. 1, 3 and 4 is to be preferred over a method in which the amplitude of the signal 25 is varied, because in that case the direct current variation of the beam current through the picture tube first has to be converted again into an alternating voltage variation of the signal 25. In principle, however, the method of varying the amplitude of the signal 25 as a function of the high voltage load is alternatively possible.

Another method of control is not to vary the amplitude of the signal 25 but the duration of the time that the signal 25 produces conduction in the tube 2. In the embodiments of FIGS. 1, 3 and 4 this would mean that the duration of the positive going pulses of the signal 25 have to be shortened according as the beam current through the tubes 16 and 16' respectively assumes a smaller value. So in that case the beam current variation would have to be converted into the variation of the duration of the pulses of the signal 25. However, this conversion is even more troublesome than the conversion into the amplitude variation of the signal 25, so that this latter method also, although possible in principle, is more difficult than the simple bias voltage variation as a function of the high voltage load.

Finally it is noted that in the embodiments described only tubes are shown. The circuitry arrangement according to the invention may equally readily be used for application by means of transistors. In that case the tubes 1 and 2 are replaced by transistors which serve respectively as the first and the second circuit element, the first circuit element fulfilling the normal function in a line output stage and the second circuit element again serving for supplying the required power. Alternatively, circuit arrangements with a booster diode are commonly used in transistor circuits because in that case often the combination of booster diode and efficiency diode is used. Otherwise it should be taken into account that the permissible natural dissipation of a transistor is small so that the supply of power must be effected in a manner such that the natural dissipation of the second circuit element does not exceed the permissible dissipation. However, this is very readily possible when the winding 18 is given a sufficient number of turns.

It will also be clear that the control circuit, as in the embodiment shown in FIG. 3 constituted by means of the elements 40, 41 and 42, may be constructed in any form if only it produces a control voltage for supplying to the first control grid of the tube 1 (in which case the direct current amplification of the tube 1 is used) or to the control grid of the second tube (in which case the required amplification can also be supplied by the control circuit).

What is claimed is:

1. A circuit arrangement for producing a high voltage and a sawtooth deflection current having a stroke period and a flyback period, comprising a transformer having a magnetic core, a first winding on said core, an electron discharge device connected to said winding, input control means coupled to said discharge device for producing periodic conduction in said discharge device and current flow through said winding generating a magnetic flux in said core in a given direction during one of said periods, rectifier circuit means coupled to said transformer for producing a high voltage, a second winding on said core, a second electron discharge device connected to said second winding, input control means coupled to said second discharge device for periodically rendering the same conductive during one of said periods at a rate in synchronism with conduction in said first device, said second winding being poled to produce during the conduction period of said second discharge device a magnetic flux having the same direction as the magnetic flux then existing in said core by reason of current flow in said first winding, means for developing potential variations as determined by variations of the amplitude of said high voltage, and means responsive to said potential variations for varying the current flow through one of said electron discharge devices.

2. A circuit arrangement as claimed in claim 1 further comprising a capacitor, a booster diode circuit coupled to said transformer and to said capacitor, and wherein said means for varying the current flow through one of said discharge devices comprises means for varying the average current of said second discharge device.

3. A circuit arrangement as claimed in claim 1 wherein a signal having a sawtooth wave-form is applied to the input control means of said first device and a signal having a rectangular wave-form is applied to the input control means of said second device, and both of said devices are conductive during the said stroke period.

4. A circuit arrangement as claimed in claim 3 wherein said means for varying the current flow through one of said discharge devices comprises means for producing a bias voltage having a value determined by the departure of the amplitude of said high voltage from a given value, and means for applying said bias voltage to the input control means of said second discharge device.

5. A circuit arrangement as claimed in claim 1 further comprising a booster diode and a capacitor and wherein said first winding comprises first, second and third winding portions connected in series, wherein said first discharge device comprises an output electrode connected to a first tapping of said winding, wherein one electrode of said diode is connected to a second tapping of said winding, wherein said capacitor is connected between an end of said winding and a second electrode of said diode and wherein said rectifier circuit means is connected to the other end of said winding.

6. A circuit arrangement as claimed in claim 1 wherein said first and second discharge devices each comprise a control electrode, wherein a signal having a sawtooth wave-form is applied to the control electrode of said first discharge device, wherein a signal having a rectangular wave-form is applied to the control electrode of said second discharge device, and further comprising a third electron discharge device having input and output electrodes, a resistor in circuit with said first discharge device, means for applying a potential having a value determined by the amplitude of said high voltage to the control electrode of said first device, means for applying potential variations across said resistor as an input signal to said third discharge device, means for applying pulsiform signals derived from said transformer as a second signal input to said third device thereby to produce an electrical quantity having a value as determined by the amplitude of said high voltage, and means for applying said electrical quantity to the control electrode of said second device thereby to control current flow through said second device as determined by the amplitude of said high voltage.

References Cited

UNITED STATES PATENTS 2,726,340   12/1955   Nelson _____ 315—27

RODNEY D. BENNETT, Jr., Primary Examiner

JOSEPH G. BAXTER, Assistant Examiner